(12) United States Patent
Beveridge et al.

(10) Patent No.: US 10,997,471 B2
(45) Date of Patent: May 4, 2021

(54) MACHINE LEARNING MODEL SCORE OBFUSCATION USING VECTOR MODIFICATION TECHNIQUES

(71) Applicant: Cylance Inc., Irvine, CA (US)

(72) Inventors: David N. Beveridge, Portland, OR (US); Hailey Buckingham, Vancouver, WA (US)

(73) Assignee: Cylance Inc., Irvine, CA (US)

( * ) Notice: Subject to any disclaimer, the term of this patent is extended or adjusted under 35 U.S.C. 154(b) by 192 days.

(21) Appl. No.: 16/399,701

(22) Filed: Apr. 30, 2019

(65) Prior Publication Data

US 2020/0349401 A1 Nov. 5, 2020

(51) Int. Cl.
*G06K 9/62* (2006.01)
*G06F 21/56* (2013.01)
*G06N 20/10* (2019.01)
*G06N 3/00* (2006.01)
*G06F 21/14* (2013.01)
*G06N 3/04* (2006.01)

(52) U.S. Cl.
CPC ......... *G06K 9/6269* (2013.01); *G06F 21/562* (2013.01); *G06K 9/6232* (2013.01); *G06N 20/10* (2019.01)

(58) Field of Classification Search
CPC .. G06K 9/6269; G06K 9/6232; G06K 9/6271; G06K 9/6265; G06F 21/562; G06F 21/14; G06N 3/00; G06N 3/0436; G06N 20/10
See application file for complete search history.

(56) References Cited

U.S. PATENT DOCUMENTS

2017/0235848 A1* 8/2017 Van Dusen ........... G06F 16/904
 705/12
2020/0184278 A1* 6/2020 Zadeh ................... G06F 16/953

\* cited by examiner

*Primary Examiner* — Asghar H Bilgrami
(74) *Attorney, Agent, or Firm* — Jones Day (57) ABSTRACT

An artefact is received. Features from such artefact are extracted and then populated in a vector. Subsequently, one of a plurality of available dimension reduction techniques are selected. Using the selected dimension reduction technique, the features in the vector are reduced. The vector is then input into a classification model and the score can be provided to a consuming application or process. Related apparatus, systems, techniques and articles are also described.

19 Claims, 6 Drawing Sheets

MACHINE LEARNING MODEL SCORE OBFUSCATION USING VECTOR MODIFICATION TECHNIQUES

TECHNICAL FIELD

The subject matter described herein is directed to techniques for obfuscating the output of machine learning models using vector modification techniques including multiple dimension reduction techniques and/or vector fuzzing.

BACKGROUND

Machine learning and other types of artificial intelligence models are being increasingly deployed across different applications and industries. Such models provide classifications which can be based, for example, on historical data with known outcomes or features. The classifications provided by such models (i.e., the model outputs, etc.) can take various forms including a Boolean output (e.g., good/bad, etc.), a numerical score (e.g., 0.00 to 1, 1 to 100, etc.), or a grouping (e.g., automobile, pedestrian, crosswalk, etc.). With some software implementations, the outputs of such models can be intercepted even when part of a more larger workflow. Such interception can allow a malicious actor to manipulate the classification by such models by repeatedly providing sample input data until a desired classification is received (even if such classification is not ultimately accurate).

SUMMARY

In a first aspect, an artefact is received. Features from such artefact are extracted and then populated in a vector. Subsequently, one of a plurality of available dimension reduction techniques are selected. Using the selected dimension reduction technique, the features in the vector are reduced. The vector is then input into a classification model and the score can be provided to a consuming application or process.

The classification model can characterize the artefact as being malicious or benign to access, execute, or continue to execute. Access to or execution of the artefact can be prevented when the classification model characterizes the artefact as being malicious.

The available dimension reduction technique can be selected using methodologies including a random selection algorithm, a load balancing algorithm (which takes into account available computing resources, etc.), a round robin selection algorithm, and the like.

At least one of the dimension reduction techniques utilizes principal component analysis. In addition or in the alternative, at least one of the dimension reduction techniques utilizes random projection matrices.

The classification model can be a machine learning model trained using a training data set and providing a continuous scale output. The machine learning model can include one or more of: a logistic regression model, a neural network, a concurrent neural network, a recurrent neural network, a generative adversarial network, a support vector machine, a random forest, or a Bayesian model.

In an interrelated aspect, an artefact is received. The features are extracted from the artefact to populate a vector. The vector is fuzzed using an obfuscation algorithm. The vector is then input into a classification model to generate a score. This score can be provided to a consuming application or process.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for obfuscating the output of an AI/machine learning model. Such obfuscation is particularly important for applications such as malware detection as it prevents a malicious actor from iteratively modifying a malicious file or code until such time that the model classifies such file or code as being safe to execute or otherwise access.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

When practical, similar reference numbers denote similar structures, features, or elements.

DETAILED DESCRIPTION

The current subject matter is directed to techniques for obfuscating an output of a software-based classifier by using different vector modification techniques (e.g., dimension reduction, vector fuzzing, etc.) which result in different scores but which provide the same or similar ultimate classification. The classifier in this regard can be an AI/machine learning model that outputs at least one value that characterizes the input to such model. While the current subject matter provides examples relating to models used for detection of malicious software ("malware"), it will be appreciated that the current subject matter can, unless otherwise specified, apply to other applications/workflows utilizing a model including, for example, autonomous vehicle navigation systems, image analysis systems, biometric security systems, video game cheat circumvention systems, and the like.

In some cases, the output of a classification model can be intercepted and exploited by a malicious actor as part of an adversarial attack. For example, data exchanged between a client and a remote server executing the classification model can be accessed such that small changes can be made to the data (e.g., file, code, artifact, etc.) input into the classification model until a desired outcome (from the point of view of the malicious actor) is obtained. For example, a malicious actor either automatically or through manual modifications can make small changes to a file encapsulating malicious code until such time that classification model determines that such file is safe to execute or otherwise access.

Figure 1:
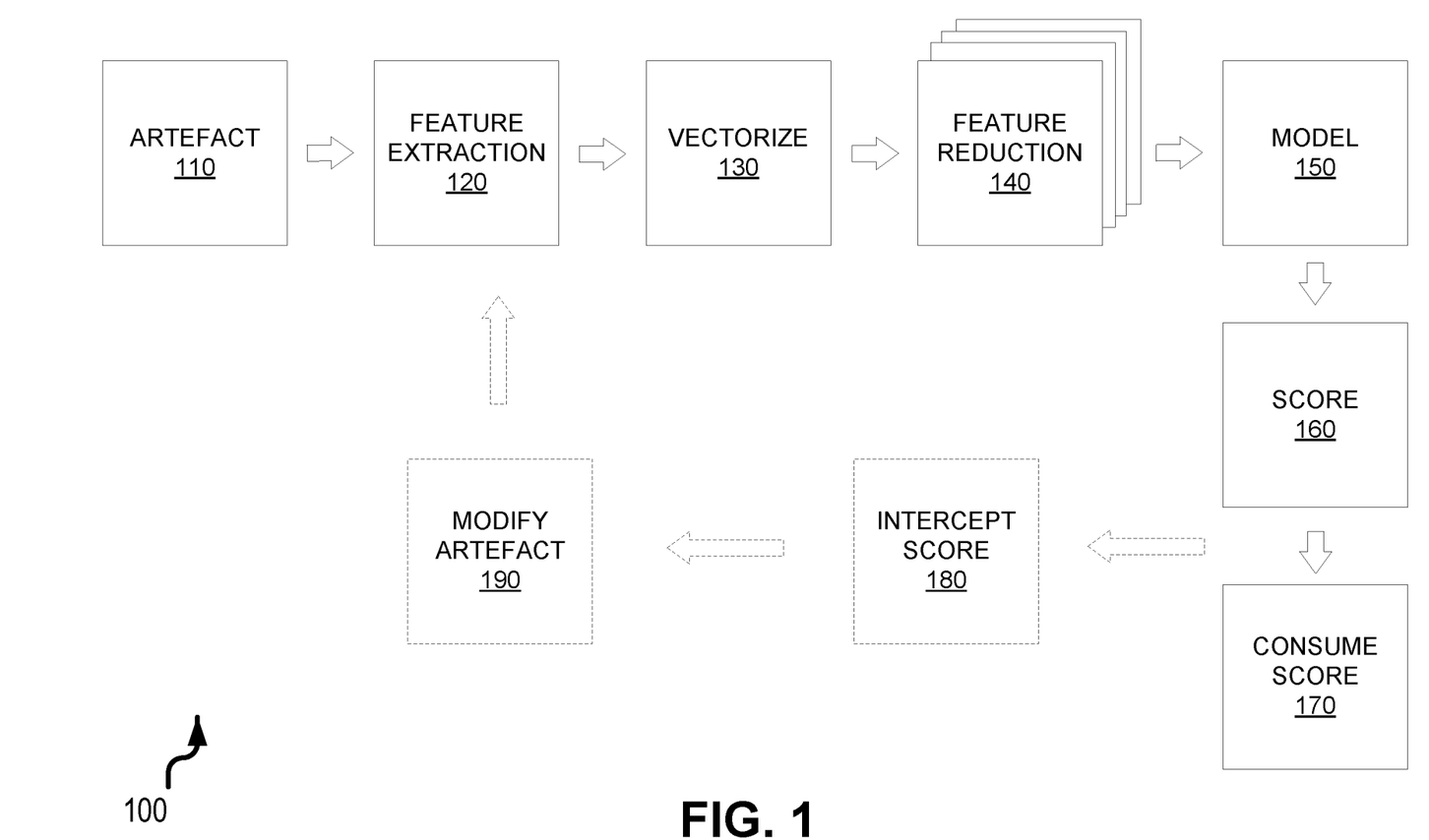
FIG. 1 is a process flow diagram illustrating a first computer-implemented workflow for obfuscating a classification of an artefact by using a plurality of classification model using different dimension reduction techniques.

FIG. 1 is a process flow diagram 100 illustrating a sample computer-implemented workflow for use with the current techniques for score obfuscation. Initially, an artefact 110 can be received (e.g., accessed, loaded, received from a remote computing system, etc.). The artefact 110 can be a file, a portion of a file, metadata characterizing a file, and/or source code. This artefact 110 can be parsed or otherwise processed by an observer. In particular, the observer can extract 120 features (sometimes referred to as attributes or observations) from the artefact and vectorize 130 such features. Further, depending on the complexity and/or quantity of features within a vector, a feature reduction operation 140 can be performed on the vector which reduces the amount of dimensions of such vector. The feature reduction operation 140 can utilize various techniques including, but not limited to, principal component analysis and random projection matrices to reduce the number of extracted features within the vector while, at the same time, remaining useful (i.e., for classification purposes, etc.) when input into one or more classification models 150. In addition, as provided herein, there can be a plurality of dimension reduction techniques (to affect the feature reduction operation 140) and the feature reduction operation 140 can involve selecting one of such dimension reduction techniques. Such selection can be performed using a random selection algorithm, a round robin selection algorithm, a load balancing algorithm and/or based on available computing resources, etc. The dimension reduction techniques can be different random projection matrices, different principal component analysis techniques and more. As random projection matrices are, by nature, random, it is easy to generate as many of them as needed for this technique. Principle components analysis (PCA) is deterministic by default. To create multiple PCA results suitable for the techniques described herein, random perturbations to the inputs of the PCA function can be used, such as randomly selecting a subset of the input data, rather than inputting the entire feature vector 130, etc.

During model training, the input data to the model can be multiplied by the number of the plurality of feature reduction techniques, such that every example in the training data would be replicated at least once for each of the feature reduction techniques chosen. In this way, a single model can be trained which could accept the inputs from any of the plurality of feature reduction techniques.

With the current subject matter, the classification models 150 are trained or otherwise configured to provide the same or a substantially similar classification of the artefact 110 despite the different utilized dimension reduction techniques.

Additionally, with arrangements in which there are multiple random protection matrices, when looking at a single malicious change to input in the model 150, the Δscore for that particular change is different depending upon which randomly selected random projection matric is used. Further, although the overall classification can remain the same, with the current subject matter, the vector modification techniques cause small changes to the score value which can mislead the malicious actor into thinking that they had been responsible for that score change (and they may ultimately follow the red herring, etc.).

The classification models 150 can take various forms including, without limitation, a logistic regression model, a neural network (including concurrent neural networks, recurrent neural networks, generative adversarial networks, etc.), a support vector machine, a random forest, a Bayesian model, and the like. The output of the classification models 150 can be a score 160. As used herein, unless otherwise specified, the score can be a numeric value, a classification type or cluster, or other alphanumeric output which, in turn, can be used by a consuming process 170 or application to take some subsequent action. For malware applications, the score can be used to determine whether or not to access, execute, continue to execute, quarantine, or take some other remedial action which would prevent a software and/or computing system from being infected or otherwise infiltrated by malicious code or other information encapsulated within the artefact 110.

FIG. 1 further illustrates the interception of the score 180. Such interception can occur, for example, when the API of the consuming application is known; by dumping DLL/SO exports with link, nm, objdump; by using various reverse-compilers; by observing stack/heap/registers during execution for function-calling behavior, and the like. Other API (i.e., function)-discovering techniques can also be used.

In an arrangement in which the output of the model 150 can be readily ascertained (e.g., a single model 150 arrangement without score obfuscation), the score 160 can be used by a malicious actor to modify the artefact 190 and repeat the process until such time that a desired score 160 by the corresponding model 150. For example, the modified artefact 190 can encapsulate malicious script and small changes to the artefact 110 could result in the corresponding classification model 150 classifying such modified artefact 190 as being benign.

Modifications to an artefact 150 can be done in such a way as to maintain the original character or nature of the artefact 150. In the example of an actor attempting to modify a malicious file (malware), any modifications must be such that the malware still operates as intended. Such modifications can be made by (for instance) adding to, removing from, or altering un-used portions of the malicious file. As these portions of the file are unused, they have no effect on the realized behavior of the file, but may result in a different score 160 from the model 150. Alternatively or additionally, used sections of the artefact 150 can also be modified, so long as the final function of the malware is left intact.

Whether manually, or in an automated system, the actor or system will typically make many small changes, and get new scores 160 from the model 150. Any change that moved the score 160 in the desired direction (i.e. in the malware example, moving the score closer to a value that is interpreted as benign) is maintained, while other changes are discarded. Such an iterative process can be repeated until the cumulative changes to the artefact 110 result in a cumulative change in the score 150 which accomplishes the desired effect. The obfuscation techniques provided herein can interrupt this cycle of iterative improvements by masking the true effect of each change to an artefact 110 with a false or misleading change in the score 160 which is determined by the obfuscation techniques herein.

Figure 2:
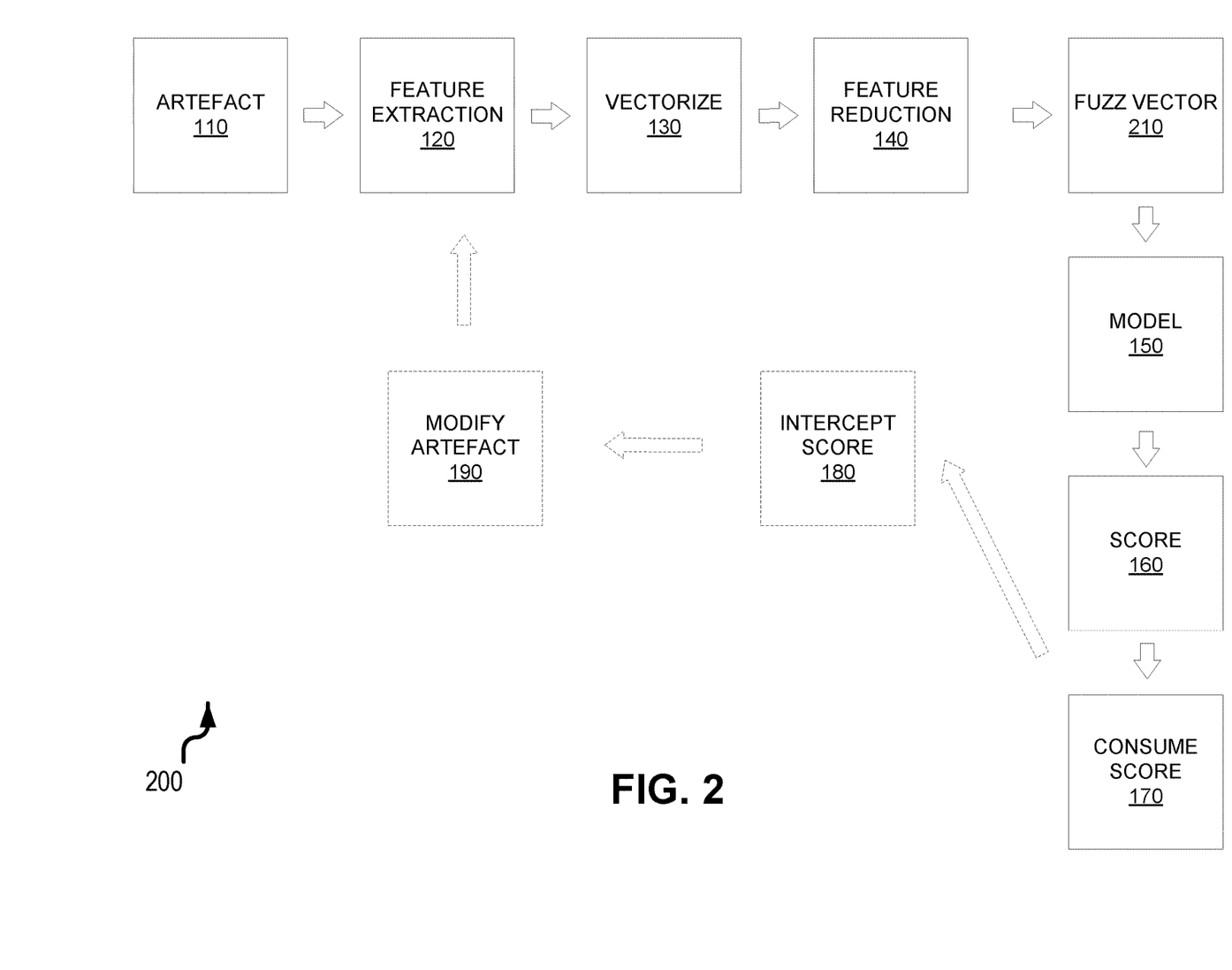
FIG. 2 is a process flow diagram illustrating a first computer-implemented workflow for obfuscating a classification of an artefact by using vector fuzzing.

FIG. 2 is a diagram 200 illustrating an alternative arrangement in which, at 210, the vector is fuzzed (which can, as illustrated, be subsequent to the feature reduction 140 in the overall workflow). Such fuzzing at 210 can involve altering the vectors which are input into the model 150, without using a plurality of dimension reduction techniques, would be to add random or deterministic noise to each value in the vector. Small changes to vector inputs can produce changes in the final score 160 which the model outputs. Just as with the small score changes induced by different dimension reduction calculations, the score changes induced by this vector "fuzzing" can mislead the malicious actor about the effect of their iterative changes to the file or artifact in question.

The fuzzing algorithm 210 can take various forms. Noise can be added to some or all of the features in a vector according to some noise distribution, such as, but not limited to uniform random noise, Gaussian noise, noise distributed according to some F-distribution, and/or noise generated according to some exponential decay function. Other noise generation techniques can be utilized.

For features that are binary or categorical in nature, noise can also be generated by changing those features according to some probability function, such that, on average, a predictable number of such features would have flipped values in any realization of a vector that has been so modified. This type of noise can be done separately, or in addition to noise generated by the various distributions described above.

During model training, each original data point (file, artefact, etc. . . . ) can be subjected to the chosen fuzzing function multiple times, producing many additional training samples. In this way, a single model 150 can be trained such that it is robust to such changes, while still yielding small score changes (though not classification changes) which would mislead the adversary.

Figure 3:
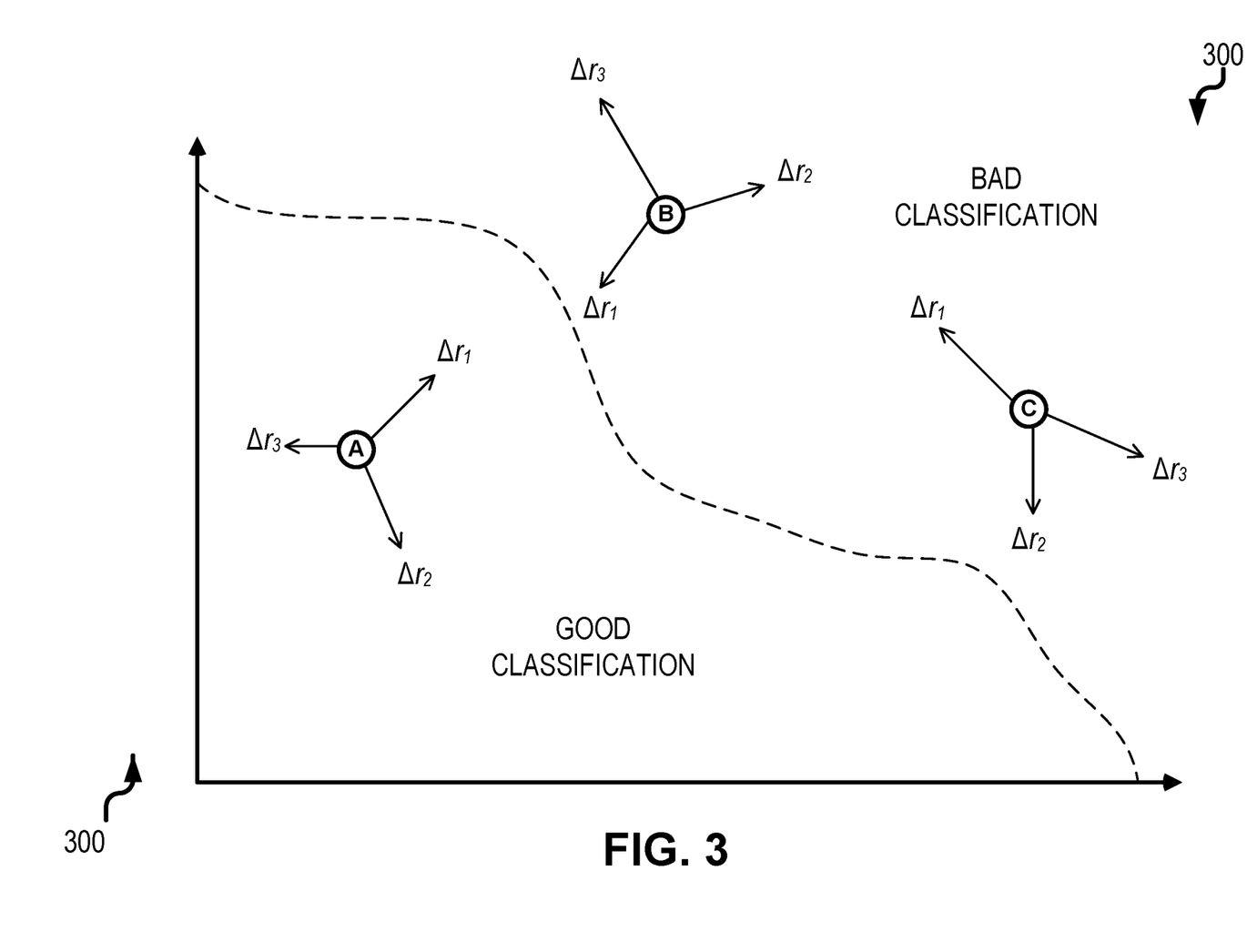
FIG. 3 is a diagram illustrating how score variations generated using the obfuscation techniques described herein can provide the same classification.

FIG. 3 is a diagram 300 illustrating how three scores A, B, and C can be obfuscated using a vector modification technique such as different dimension reduction techniques and/or by vector fuzzing while, at the same time, providing the same overall classification. For example, referring to diagram 300, the dotted lines illustrates a demarcation between good (benign, etc.) and bad (malicious, etc.) classification with the circles representing the true scores A, B, and C for respective artefacts. Using the dimension reduction techniques and/or vector fuzzing causes other scores $\Delta r_1$, $\Delta r_2$, and $\Delta r_3$ 160 to be output by the model 150 which have different values but which are still classified and utilized in the same manner by the consumer 170. However, the variation in the ultimate score 160 makes it more difficult to reverse engineer or otherwise game the model 150. The utilized dimension reduction techniques (e.g., random projection matrices, principal component analysis, etc.) and/or the vector fuzzing can be configured or otherwise trained such that the resultant scores never cross the classification spline (i.e., the line specifying good vs. bad).

Figure 4:
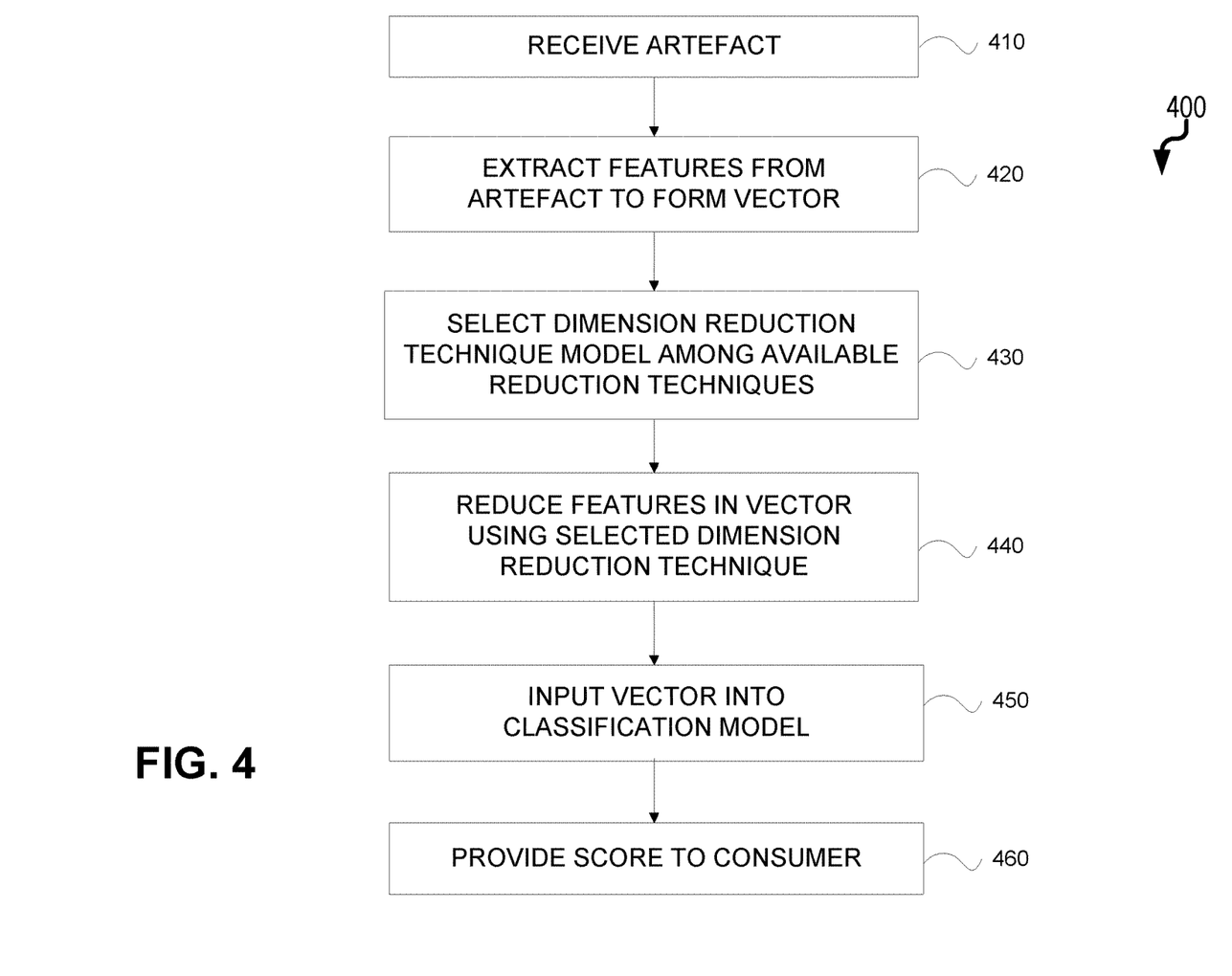
FIG. 4 is a process flow diagram illustrating a second computer-implemented workflow for obfuscating a classification of an artefact by using a plurality of classification model using different dimension reduction techniques.

FIG. 4 is a process flow diagram 400 in which, at 410, an artefact is received. Thereafter, at 420, features are extracted from the artefact and such extracted features are populated in the vector. Next, at 430, one of a plurality of available dimension reduction techniques is selected. Using the selected dimension reduction technique, at 440, the features are reduced. The vector is then input, at 450, into a classification model to generate a score. The score is then provided, at 460, to a consuming application or process. For example, the consuming application or process can use such score to make a determination of whether or not to access, execute, or continue to execute the artefact (i.e., it can be used to prevent malware from infiltrating a computing and/or software system, etc.).

Figure 5:
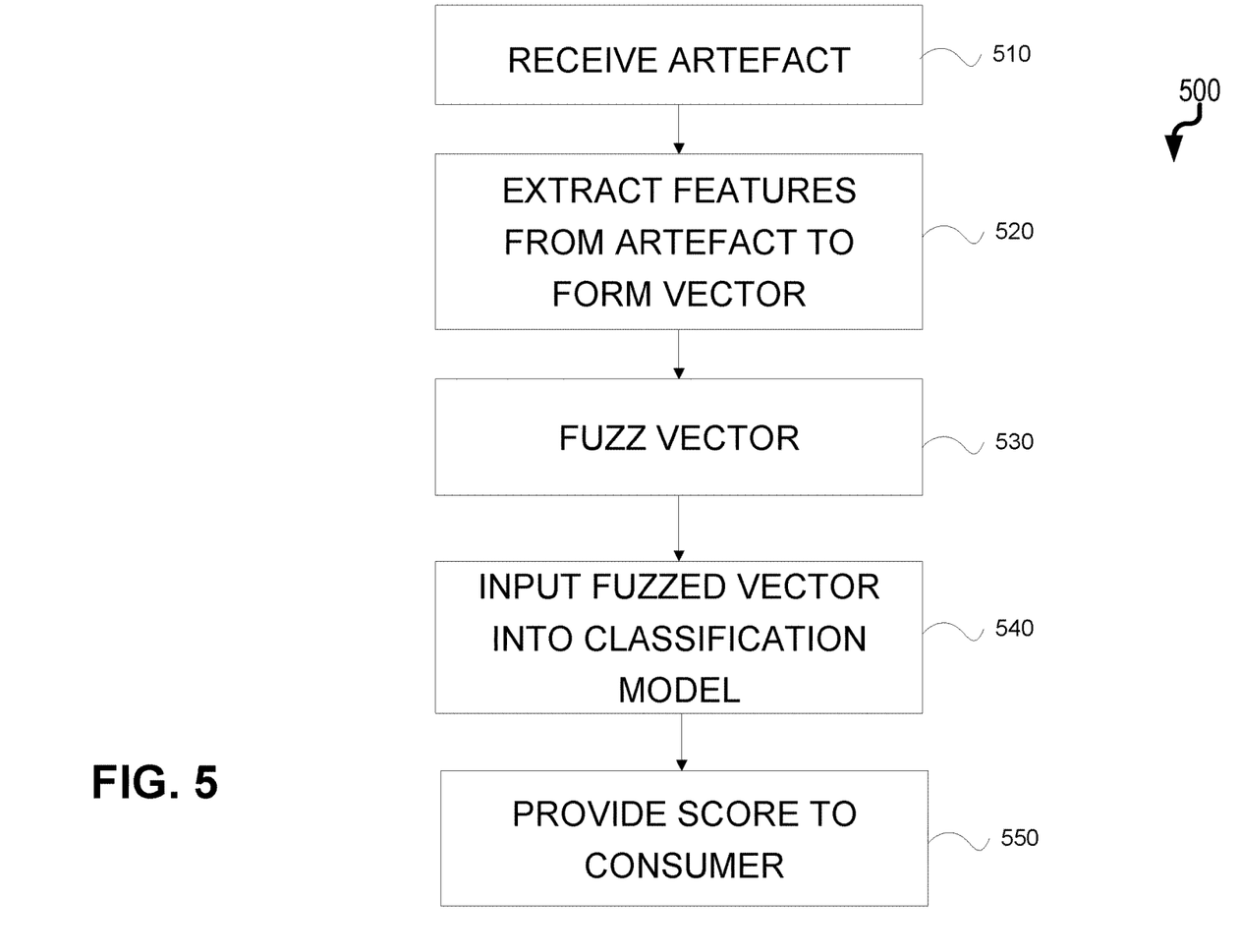
FIG. 5 is a process flow diagram illustrating a second computer-implemented workflow for obfuscating a classification of an artefact by using vector fuzzing.

FIG. 5 is a diagram 500 in which, at 510, an artefact is received. Thereafter, at 520, features are extracted from the artefact so that a vector can be populated. This vector is then fuzzed, at 530, using an obfuscation algorithm or other technique. The vector can later be input, at 540, into a classification model to generate a score and such score can be provide, at 550, to a consuming application or process. As with the example of FIG. 4, the consuming application or process can use such score to make a determination of whether or not to access, execute, or continue to execute the artefact (i.e., it can be used to prevent malware from infiltrating a computing and/or software system, etc.). The fuzzing provided by the obfuscation algorithm notably does not change the ultimate classification of the artefact (but does change the score).

Figure 6:
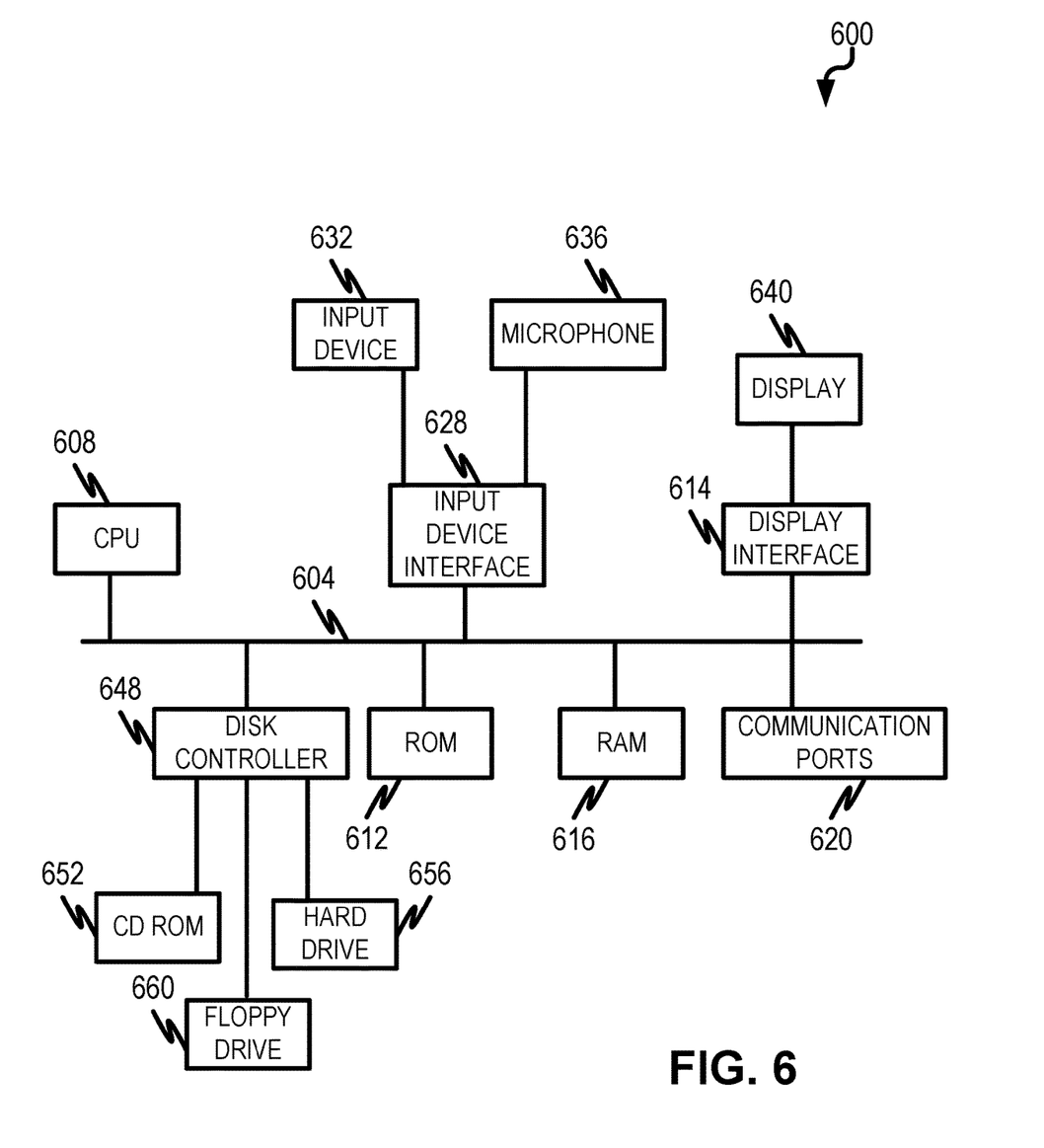
FIG. 6 is a diagram illustrating a computing device that can be used to implement aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers/processor cores, etc., can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 630 includes or otherwise comprises a network interface.

To provide for interaction with a user, the subject matter described herein can be implemented on a computing device having a display device 630 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising: receiving an artefact; extracting features from the artefact and populating a vector; selecting one of a plurality of available dimension reduction techniques; reducing the features in the vector using the selected dimension reduction technique; inputting the vector into a classification model to generate a score, the classification model characterizing the artefact as being malicious or benign to access, execute, or continue to execute; and providing the score to a consuming application or process.

2. The method of claim 1 further comprising: preventing access or execution of the artefact when the classification model characterizes the artefact as being malicious.

3. The method of claim 1, wherein the available dimension reduction technique is selected using a random selection algorithm.

4. The method claim 1, wherein the available dimension reduction technique is selected using a load balancing algorithm.

5. The method of claim 1, wherein the available dimension reduction technique is selected using a round robin selection algorithm.

6. The method of claim 1 further comprising training the classification model to take into account the use of multiple feature reduction techniques.

7. The method of claim 1, wherein at least one of the dimension reduction techniques utilizes principal component analysis.

8. The method of claim 1, wherein at least one of the dimension reduction techniques utilizes random projection matrices.

9. The method of claim 1, wherein the classification model is a machine learning model trained using a training data set and providing a continuous scale output.

10. The method of claim 9, wherein the machine learning model comprises one or more of: a logistic regression model, a neural network, a concurrent neural network, a recurrent neural network, a generative adversarial network, a support vector machine, a random forest, or a Bayesian model.

11. A system comprising: at least one data processor; and memory storing instructions which, when executed by the at least one data processor, result in operations comprising: receiving an artefact; extracting features from the artefact and populating a vector; selecting one of a plurality of available dimension reduction techniques; reducing the features in the vector using the selected dimension reduction technique; inputting the vector into a classification model to generate a score, the classification model characterizing the artefact as being malicious or benign to access, execute, or continue to execute; and providing the score to a consuming application or process.

12. A computer-implemented method comprising: receiving an artefact; extracting features from the artefact and populating a vector; fuzzing the vector using an obfuscation algorithm; inputting the vector into a classification model to generate a score, the classification model characterizing the artefact as being malicious or benign to access, execute, or continue to execute; and providing the score to a consuming application or process.

13. The method of claim 12 further comprising: preventing access or execution of the artefact when the classification model characterizes the artefact as being malicious.

14. The method of claim 12, further comprising: reducing the features in the vector using a dimension reduction technique.

15. The method of claim 14, wherein the dimension reduction technique utilizes principal component analysis.

16. The method of claim 14, wherein the dimension reduction technique utilizes random projection matrices.

17. The method of claim 12, wherein the classification model is a machine learning model trained using a training data set and providing a continuous scale output.

18. The method of claim 17, wherein the machine learning model comprises one or more of: a logistic regression model, a neural network, a concurrent neural network, a recurrent neural network, a generative adversarial network, a support vector machine, a random forest, or a Bayesian model.

19. The method of claim 12 further comprising training the classification model to take into account the fuzzing of the vector using the obfuscation algorithm.

* * * * *